United States Patent [19]

Douglas

[11] 4,140,381
[45] Feb. 20, 1979

[54] MULTIPLE FORMAT PHOTOGRAHIC CAMERA

[75] Inventor: Lawrence M. Douglas, South Easton, Mass.

[73] Assignee: Polaroid Corporation, Cambridge, Mass.

[21] Appl. No.: 832,924

[22] Filed: Sep. 13, 1977

[51] Int. Cl.² ............... G03B 35/00; G03B 15/03; G03B 9/10; G03B 9/36
[52] U.S. Cl. ............... 354/111; 354/121; 354/123; 354/148; 354/245; 354/250
[58] Field of Search ............... 354/111, 121, 123, 125, 354/126, 129, 222, 266, 148, 245, 250

[56] References Cited

U.S. PATENT DOCUMENTS

| | | | |
|---|---|---|---|
| 689,994 | 12/1901 | Spooner | 354/121 |
| 1,103,745 | 7/1914 | Farquhar | 354/125 |
| 1,173,861 | 2/1916 | Quinn | 354/125 |
| 1,282,373 | 10/1918 | Browning | 354/121 |
| 1,575,990 | 3/1926 | Hayes | 354/125 |
| 2,043,900 | 6/1936 | Mihalyi | 354/222 X |
| 2,413,058 | 12/1946 | London | 354/121 |
| 2,446,200 | 8/1948 | Tait | 354/121 |
| 3,069,987 | 12/1962 | Harrington | 354/120 |
| 3,282,186 | 11/1966 | Niccolls | 354/121 |
| 3,283,685 | 11/1966 | Cummins | 354/118 |
| 3,323,432 | 6/1967 | Rabanit | 354/111 |
| 3,429,247 | 2/1969 | Rice | 354/229 |
| 3,504,607 | 4/1970 | Bok | 354/111 |
| 3,589,254 | 6/1971 | Johnson | 354/143 |
| 3,593,634 | 7/1971 | Guntersweiler | 354/123 X |
| 3,598,035 | 8/1971 | Haller | 354/121 |
| 3,772,977 | 11/1973 | Guccione | 354/121 |
| 3,935,580 | 1/1976 | Klainos | 354/121 |
| 3,984,850 | 10/1976 | Bley | 354/125 |

Primary Examiner—L. T. Hix
Assistant Examiner—William B. Perkey
Attorney, Agent, or Firm—Frank J. Caufield

[57] ABSTRACT

A photographic camera is disclosed having a single movable lens which may be utilized to optionally produce, on a given-sized film element, either one large format picture or a plurality of separately exposed smaller format pictures.

15 Claims, 9 Drawing Figures

MULTIPLE FORMAT PHOTOGRAHIC CAMERA

BACKGROUND OF THE INVENTION

1. Field of the Invention

This invention relates to photography, and, more particularly, to a photographic camera of the type which utilizes a single lens to optionally produce, on a given-sized film element, either a large format picture or a plurality of smaller format pictures.

2. Description of the Prior Art

"Multiple format" photographic systems are those which have the capability of optionally producing pictures of different sizes. Such systems are well known in the photographic arts and have been described in the patent literature.

One example of a multiple format system is disclosed in U.S. Pat. No. 3,593,634 issued to Emil Guntersweiler on July 20, 1971 and entitled "Apparatus for Making a Large-Format Photograph or a Number of Small-Format Photographs with the Same Total Surface Area". In this patent, apparatus is described which utilizes two rotatably mounted lenses having different focal lengths to optionally produce either one large format photograph or a pair of two identical smaller format photographs which cover substantially the same total surface area as would otherwise be occupied by the larger format photograph. The pair of smaller format photographs are arranged one above the other with the two identical smaller photographs arranged one aside of the other.

This apparatus, which is particularly suitable for use in a photobooth, is somewhat complex and bulky and requires displacing a web of conventional photosensitive material to properly align the material with the appropriate lens when making the smaller format photographs.

Another example is disclosed in U.S. Pat. No. 3,413,958 issued to J. A. London on Dec. 24, 1946 and entitled "Multi-Shutter Camera". In this patent, photographic apparatus is described which has a camera portion that includes a single lens fixedly mounted on a rotatable turret which can be moved to any one of several selected positions and an actuable shutter arrangement which is positioned over a focal plane to selectively mask off the focal plane area to vary the size of the photograph produced in accordance with the position of the lens and the selection of the shutter arrangement. In this manner, apparatus is provided which can optionally produce either one large format photograph or a plurality of independently exposed smaller format photographs which may cover substantially the same surface area as would otherwise be occupied by the larger format photograph. However, this apparatus also requires displacing a conventional photosensitive material with respect to a focal plane to produce the plurality of smaller format photographs. Also, the apparatus is rather large therefore making it unsuitable for use as a hand held camera.

Consequently, it is a primary object of the present invention to provide a compact, hand-held, multiple-format camera.

It is another object of this invention to provide a multiple-format camera that is adapted for use with self-processable type film units.

Another object of this invention is to provide a multiple-format camera which utilizes a single objective lens to optionally produce on a given-sized film element, while the film element remains stationary, either one large format picture or a plurality of independently exposed smaller format pictures which cover substantially the same total surface area as would otherwise be occupied by the larger format picture.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates to photography, and, more particularly, to a multiple format photographic camera for optionally producing, on a given-sized film element, either a large format picture or a succession of independently exposed smaller format pictures which cover substantially the same total surface area of the film element that would otherwise be occupied by the large format pictures.

The camera comprises a housing which includes means for accommodating the positioning of at least one film element having a given photosensitive area in a focal plane.

Actuable light blocking means are provided for selectively controlling the size of the film elements given photosensitive area that may be exposed to light. The light blocking means is configured and arranged to permit light to expose the film elements' entire photosensitive area to make one large picture or only a predetermined fractional part of the film elements' given photosensitive area at a time so that individual regions of the film elements' photosensitive area may be independently exposed to light, in succession, to make a plurality of smaller format pictures which cover substantially the same area that would otherwise be occupied by the large picture.

A manually operable picture format selection feature is provided for providing the camera user with the option of placing the camera in readiness for making either one large format picture or a plurality of smaller format pictures.

Also included in a lens turret which is rotatably mounted on the camera housing. Slidably mounted on the lens turret is an objective taking lens which may be manually moved between a first on-axis position and a second off-axis position radially spaced from the on-axis position. With this lens mount arrangement, the optical axis of the lens may be aligned with the center of whatever region of the film elements' photosensitive area is not restricted by the blocking means from receiving light by rotating the lens turret into given angular locations and appropriately positioning the lens on the turret.

Means are provided for selectively allowing scene light emerging from the objective taking lens to impinge upon the focal plane to define a photographic exposure cycle during which cycle, an exposure of predetermined value is delivered to that photosensitive area of the film element with which the objective taking lens has been aligned and which is not restricted from receiving light by the blocking means.

Means, which are responsive to the position of the lens on the turret, are provided for preventing ambient light from entering the housing during the exposure cycle.

In the preferred embodiment of the camera, the actuable light blocking means comprise a pair of apertured frame members pivotally mounted with respect to the focal plane. Each frame member aperture is provided with a separate cover that is pivotally mounted with respect to its corresponding frame member aperture for independent actuation and is normally biased to close its corresponding frame member aperture. In this manner, the frame members may be pivoted into a first position in which the full photosensitive area of the film element may be exposed, the covers moving in conjunction with the frame members, and a second position in which the frame members cover the focal plane and the covers may be independently operated to open or close their corresponding frame member apertures.

An important feature of the preferred embodiment is the provision of actuator means in the form of independent linkage mechanisms, cooperative with the lens turret and the blocking means to automatically effect the actuation of the covers in synchronization with the placement of the lens turret into each of its angular locations after the frame members have been pivoted into their second position.

Another feature of the preferred embodiment includes means for biasing and automatically indexing the lens turret between its given angular locations.

Yet another feature of the preferred embodiment is a selectively actuable elongated blade mechanism mounted for counter-reciprocating motion on the lens turret for defining the exposure cycle. The blade mechanism rotates in conjunction with lens turret and is arranged for movement transverse to the lens turret's axis of rotation between a first blocking arrangement which precludes scene light from impinging on the focal plane and a second unblocking arrangement wherein at least one aperture value structured for transmission of scene light to the focal plane is simultaneously defined at each of the objective taking lens' positions on the lens turret.

Other features of the preferred embodiment include a flash capability and a variable field viewfinder which automatically changes field size in accordance with the picture format selected by the user.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
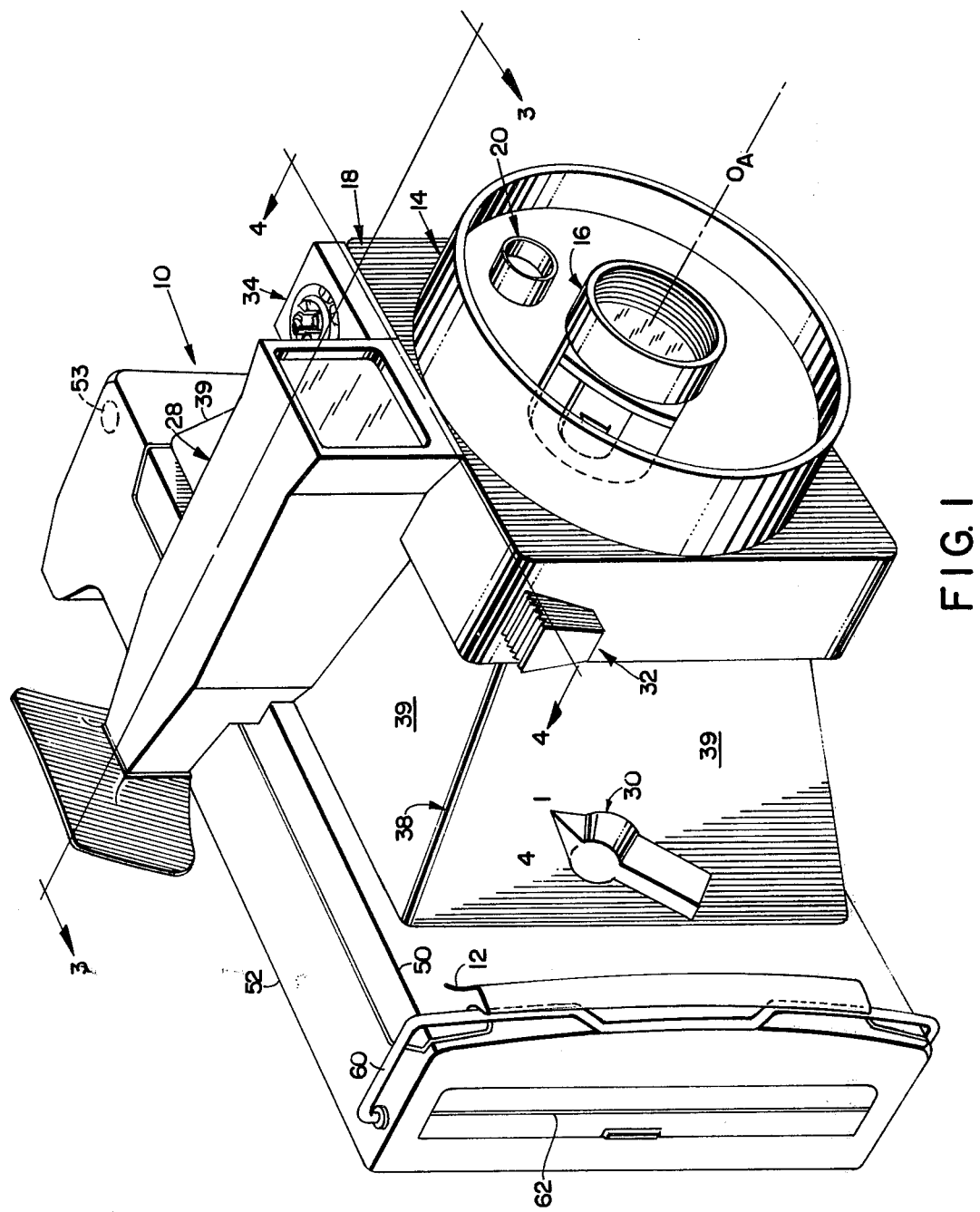
FIG. 1 is a perspective view of the camera of the invention.
Figure 2:
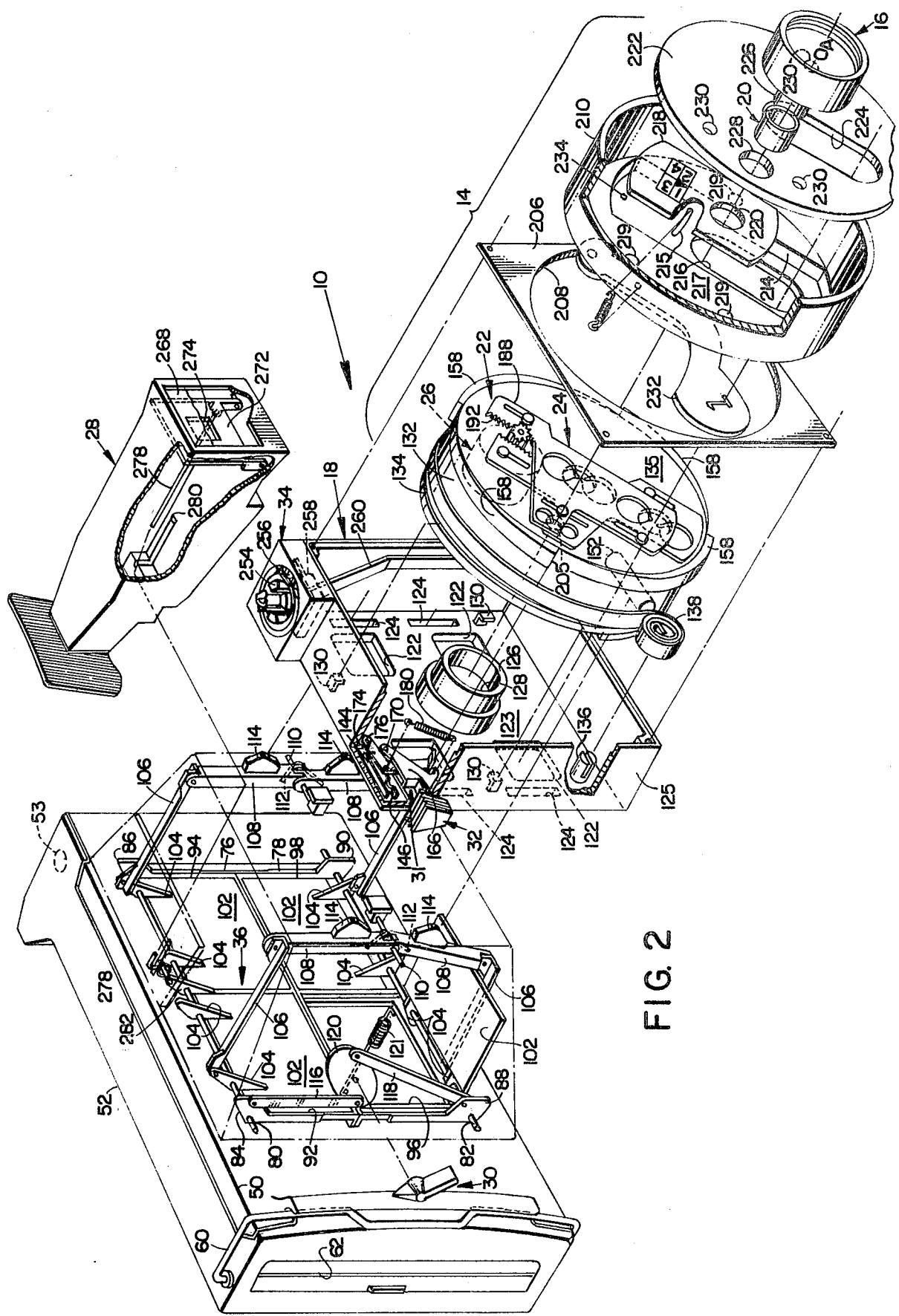
FIG. 2 is an exploded perspective, with parts broken away, of the camera of FIG. 1.

Referring now to FIG. 1, there is shown a multiple format type camera 10 which is the preferred embodiment of the present invention;

The major components of the camera 10, as best seen in FIGS. 1 and 2, comprise: a camera housing 12; a lens turret assembly 14 which supports, among other parts, an objective taking lens 16; a rectangular support member 18 which attaches to the housing 12 and supports the lens turret assembly 14; a photometer optical system 20 located on the lens turret assembly 14; a shutter assembly generally shown at 22, including a blade mechanism 24 and a stepper type motor 26, which is mounted within the lens turret assembly 14 and provides the camera 10 with a selective exposure capability; a variable field viewfinder assembly 28 which facilitates the aiming of the camera 10 to frame the subject matter to be photographed; a manually operable picture format selector lever 30 located on a side of the housing 12; an escapement mechanism 31 including a camera actuating button 32 located near a corner of the rectangular support member 18; a flashcube assembly 34 located near another corner of the support member 18; and an actuable light blocking arrangement located in the housing 12 and designated generally at 36.

Figure 7:
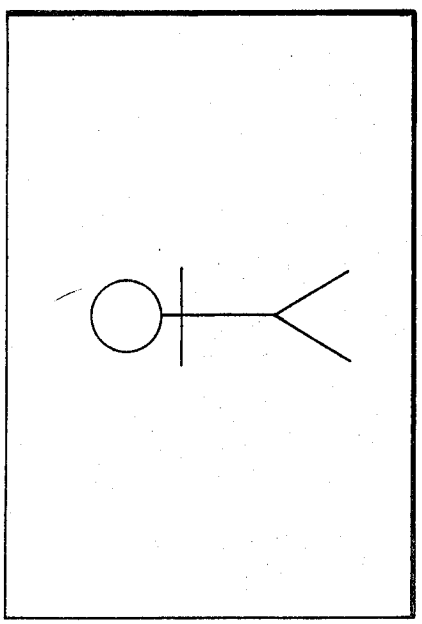
FIGS. 7 and 8 are diagrammatic representations of pictures taken with the camera of FIG. 1.
Figure 8:
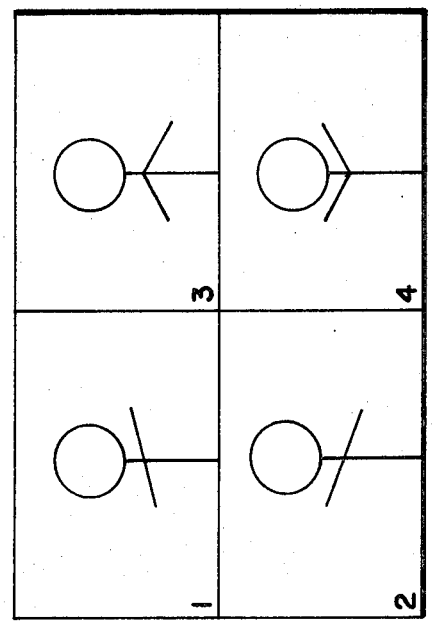

These major components, along with their constituent parts, which will shortly be described in detail, cooperate to provide the camera 10 with the capability of utilizing a single lens, 16, to optionally produce, on a given-sized film element, either one large format picture or a succession of smaller format pictures, each independently exposed, which cover substantially the same total surface area that would otherwise be occupied by the large format picture (see FIG. 7, large format picture, and FIG. 8, smaller format pictures).

The structural and functional features of the constituent parts of the major components of the camera 10 will now be described.

Camera Housing

Figure 3:
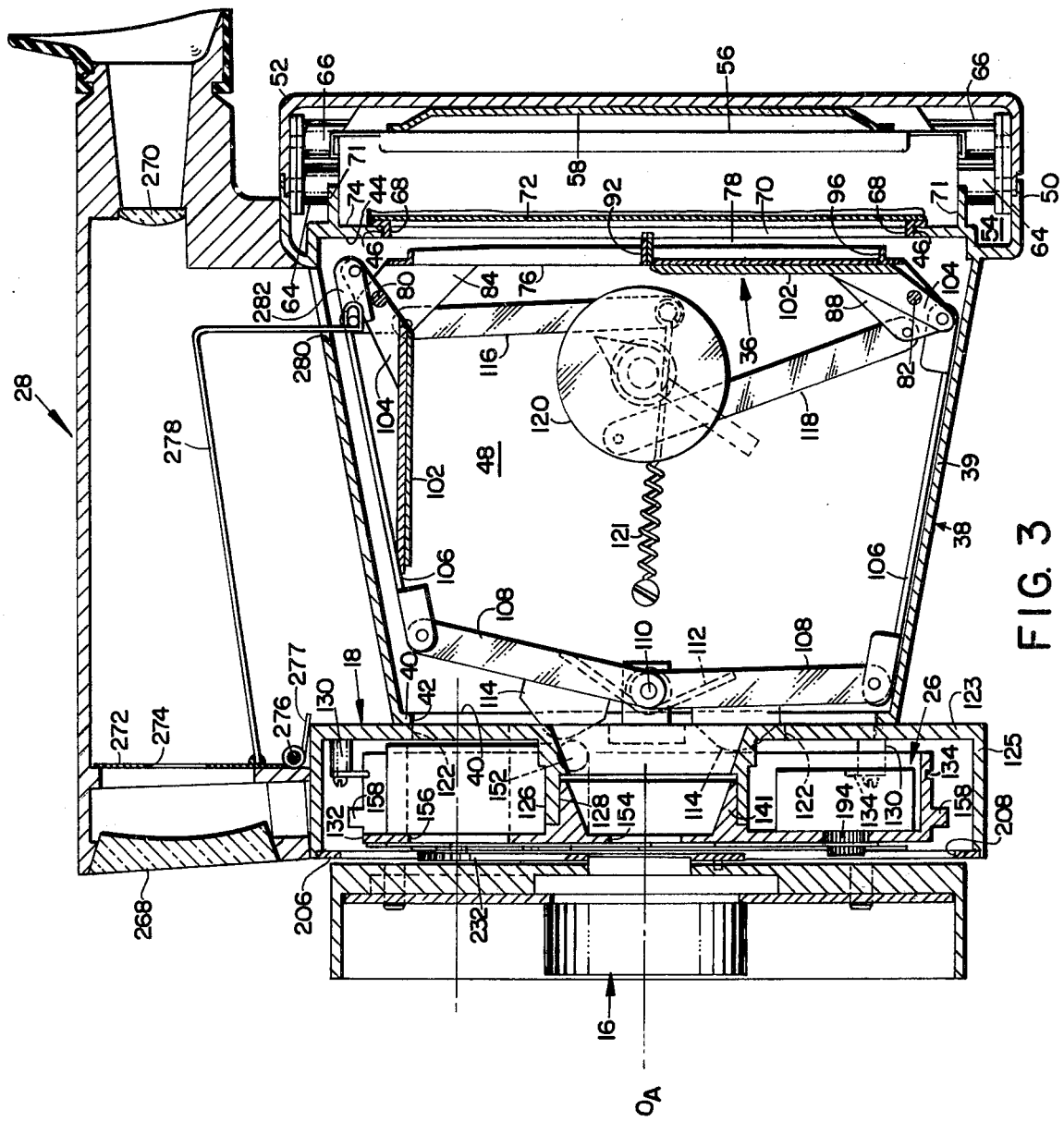
FIG. 3 is a section of the camera of FIG. 1 taken generally along lines 3—3 of FIG. 1.

As best seen in FIGS. 1, 2 and 3, the camera housing 12, which serves as the primary structural member for supporting the various components of the camera 10, comprises a cone section 38, a rear housing section 50, and a door 52 which is mounted for rotation with respect to the rear housing section 50 in a well known manner by a pair of spaced apart pivot pins 53 (only one shown).

The cone section 38 is formed by a plurality of interconnected wall sections including four trapazoidal side wall sections 39, a forward wall section 40, and a rear wall section 44 (see FIG. 3). Included in the forward wall section 40 is an entrance opening 42, and in the rear wall section 44, and exit opening 46. The wall sections, 39, 40 and 44, thus arranged cooperate, in part, to provide the camera 10 with an exposure chamber 48 (FIG. 3) into which scene light from the objective taking lens 16 may enter through the opening 42 and exit through the opening 46.

The rear housing section 50, which is an elongated generally rectangular shaped member, transversely extends across the rear end of the cone section 38 adjacent the rear wall 44 and is preferably formed as an integral rearwardly projecting extension of the cone section 38.

The door 52, when rotated into a closed position as shown in FIG. 3, is structured to cooperate in a well known manner with complementary structure on the rear housing section 50 to provide the camera 10 with a film cassette receiving chamber 54. The chamber 54 is adapted to receive a well known film cassette, such as that designated at 56, which preferably contains a stacked array of self-processable type film units such as those described in, for example, U.S. Pat. No. 2,983,606 issued to H. G. Rogers on May 9, 1961.

A bail latch (see FIG. 1) is provided on the door 52 for purposes of locking the door 52 to the rear housing section 50 after the cassette 56 has been placed in the chamber 54.

Also provided in the door 52 is an elongated film exit slot 62 (FIG. 1) through which film units may be advanced to the outside of the camera 10 in a well known manner. Additionally provided on the door 52 are a pair of juxtaposed pressure applying rollers, 64 and 66, mounted adjacent the exit slot 62 and aligned therewith. The rollers, 64 and 66, as is well known in the art, are used for processing self-processable type film units after they have been exposed.

The cassette 56 is a flat generally rectangular shaped structure having a rectangular exposure aperture 68 see FIG. 3) whose peripheral edges mask the photosensitive area of the film units that may be exposed to light. Surrounding the exposure aperture 68 is a vertically extending flange 70 for facilitating the accurate positioning of the cassette 56 within the camera 10.

Means are provided within the cassette receiving chamber 54 for cooperating with the structure of the cassette 56 to accurately position the cassette 56 to facilitate exposure of the film elements which it contains. These means comprise a rearwardly extending flange 71 (only two sides shown in FIG. 3), depending from the rear wall 44, that is spaced away from and surrounds the exit opening 46. The flange 71 and the rear surface of the rear wall 44 cooperate to define an open ended rectangular cradle, extending rearwardly into the chamber 54, whose geometry complements that of the film cassette 56. The film cassette 56 is telescopically placed in the cradle thus formed until it rests on a plane 74 defined by the rear surface of the rear wall 44. A spring 58 is provided on the door 52 for continuously biasing the cassette 56 so that it remains seated in the cradle against the plane 74 while in the camera 10. The exit opening 46 is also dimensioned so that the cassette flange 70 is telescopically received therein.

As shown in FIG. 3, a forwardmost film unit 72 is positioned in a plane located immediately behind the film cassette's exposure aperture 68. This is the plane of best focus for the objective taking lens 16. Each film unit in the cassette 56 sequentially assumes the position of that of the film element 72 as shown in FIG. 3 in a well known manner, and thus is automatically located at the plane of best focus of the camera 10.

Thus arranged, the housing 12 includes means for accommodating the positioning of at least one film element having a given photosensitive area in a focal plane to facilitate exposure of the film element.

The housing 12 is preferably molded of an opaque plastic material to preclude ambient light.

Actuable Light Blocking Means

The camera 10 is provided with the actuable light blocking means 36 (FIG. 2) for selectively controlling the size of a film element's given photosensitive area that may be exposed to light from the objective taking lens 16; the given photosensitive area of the film element which may be exposed being defined by the edges of the exposure aperture 68 of the cassette 56 in a manner previously described.

The actuable light blocking means 36, as best shown in FIGS. 2 and 3, comprises an upper rectangular frame member 76 that is pivotally mounted for rotation about an upper pivot shaft 80 via a pair of bell cranks 84 and 86, and a lower rectangular frame member 78 that is pivotally mounted for rotation about a lower pivot shaft 82 via a pair of bell cranks 88 and 90.

The area covered by each of the frame members, 76 and 78, equals approximately one-half the area of the exit opening 46 in the rear wall 44.

The pivot shafts, 80 and 82, are mounted adjacent opposite sides of the exit opening 46 of the rear wall section 44 with their ends conventionally secured to two opposing side wall sections, 39, of the cone section 38.

Located in the upper frame member 76 are a pair of apertures, 92 and 94, positioned one aside of the other. Similarly located in the lower frame member 78 are a pair of apertures, 96 and 98. The size and location of the open area of each of the frame member's apertures, 92 through 98, are chosen in a predetermined manner to equal approximately one-fourth of the given photosensitive area of a film unit 72 located in the exposure aperture 68 of the cassette 56.

Each aperture, 92 through 98, is provided with a corresponding cover 102. The aperture covers 102 each have a pair of bell cranks 104 having their fulcrums rotationally attached to a corresponding one of the pivot shafts, 80 and 82. With this mounting arrangement, each cover 102 can be independently rotated with respect to its corresponding frame member aperture when the frame members, 76 and 78, are overlying the exit aperture 46 as illustrated in FIGS. 2 and 3.

The means for effecting the independent movement of the cover members 102 is provided in the form of a linkage mechanism for each cover 102. The linkage mechanisms of each cover 102 are identical in structure and operation and comprise connecting or push rods 106 having one end pivotally connected to one of the bell cranks 104 and another end pivotally connected to a respective one of a plurality of input levers 108. The other ends of the input levers, 108, in turn are pivotally connected to the cone section 38 by a pair of pivot pins 110 that are conventionally secured to opposing side wall sections 39 of the cone section 38.

A torsion spring 112 is provided at each of the pivot pins 110 for providing a torque which is transmitted along each linkage mechanism to normally bias each cover member 102 so that it covers its corresponding frame member aperture.

Located on each input lever 108 is a cam section 114. A rearwardly applied force on any cam section 114 will be transmitted to its corresponding aperture cover 102 via its corresponding input lever 108, connecting rod 106, and bell crank 104, to pivot the cover 102 about its corresponding pivot shaft, either 80 or 82, to a position as shown in either FIGS. 2 or 3. When in this open position, only a fractional part of the photosensitive area of the film unit can be exposed. When the applied force is then released, the opened aperture cover 102 automatically returns to its closed position under the influence of its corresponding spring 112.

This situation is illustrated best in FIG. 2 which assumes that a force has been applied to a cam section 114 in the lower left quadrant while no force is applied at the cam sections 114 in the remaining three quadrants. Consequently, when the frame members, 76 and 78, are positioned as shown in FIGS. 2 and 3, each cover member 102 may be independently actuated to open or close a corresponding frame member aperture, 92 through 98, by the appropriate application and release of a force at a corresponding cam section 114. In this manner, independent regions of the film element's given photosensitive area may be exposed, one at a time, to make four small format pictures. How the actuating force is applied will subsequently become apparent in the description that follows.

Manual Format Selection Means

Referring now to FIGS. 2 and 3, there is shown a connecting link 116 which is pivotally mounted at one end of the bell crank 84 located on the upper frame member 76 and at the other end to a rocker member 120 which is pivotally mounted to a side wall section 39 of the cone section 38. In a similar fashion, there is also a connecting link 118 that is pivotally mounted to the bell crank 88 of the lower frame member 78 at one end and at its other end to the rocker member 120. Rigidly attached to the rocker member 120 is the format selector switch 30. Also provided is a coil spring 121 having one end pinned on a side wall section 39 of the cone section 38 and another end pinned to the rocker member 120 at the point where the connecting link 116 is pivotally attached to the rocker member 120.

As shown in FIG. 1, the format selector switch 30 is located on the outside of the camera housing 12 where it is accessible to the user so that he may rotate it between two positions indicated by the numerals 1 and 4 located on the side wall 39 of the cone section 38. Rotation of the format selector switch 30 between these two positions causes the rocker member 120 to rotate through a corresponding angle because of the rigid connection between these two members. Rotation of the rocker member 120 in turn is transmitted to the bell cranks 84 and 88 of the frame members 76 and 78, respectively, via the connecting links 116 and 118, respectively. This movement causes the frame members 76 and 78 to move from their position shown in FIGS. 2 and 3 to a second open position (FIG. 9) in which they completely uncover the exit opening 46 in the rear wall 44 thereby permitting the exposure of the full photosensitive area of the film unit.

Because the covers 102 are continuously spring biased over the frame members' apertures, 92 through 98, the covers 102 automatically move in conjunction with the frame members 76 and 78 thereby uncovering the film element's entire photosensitive area when the frame members, 76 and 78, are moved into their full open position.

The second full open position of the frame members, 76 and 78, obviously occurs because the motion of the rocker member 120 causes the frame members 76 and 78 to pivot about the pivot shafts 80 and 82 in opposite directions of rotation.

The purpose of the coil spring 121 is to provide a torque for retaining the frame members, 76 and 78, in either one of their two positions after they have been placed in one of those positions. For this reason the coil spring 121 is located off center as shown in FIG. 3. In order for the coil spring 121 to fulfill this purpose effectively, its spring rate should be chosen so as to overcome any forces which may be generated either by the torsion springs 112 or through the actuation of the cover members 102 via their corresponding linkage mechanisms.

In the foregoing manner, manually operable means have been provided in the camera 10 for effecting the movement of the frame members, 76 and 78, between a first position in which they overlie the exit opening 46 and a second position in which they completely uncover the exit opening 46.

To summarize, the camera 10 has been provided with actuable light blocking means for selectively controlling the size of the film element's given photosensitive area that may be exposed to light. The light blocking means comprise a pair of frame members, 76 and 78, having the plurality of apertures, 92 through 98, each having an area which is a predetermined fractional part of the film element's given photosensitive area and each having one of the movable covers 102 spring biased to normally close each of the apertures, 92 through 98. The frame members, 76 and 78, are structured for movement into a first arrangement wherein the film element's full photosensitive area may be exposed to light to produce one large picture and a second arrangement wherein the frame members, 76 and 78, including the covers 102, initially preclude exposure of the film element. Thereafter each of the covers 102 is adapted to be independently actuated to open or close the apertures, 92 through 98, so that individual regions of the film element's given photosensitive area may be successively exposed to light to make a plurality of smaller pictures which cover substantially the same area of the film element that would otherwise be occupied by the large picture.

In addition the camera 10 has been provided with a manual format selection arrangement which provides the camera user with the option of placing the camera in readiness to take either one large format picture or four smaller format pictures.

Rectangular Support Member

Figure 4:
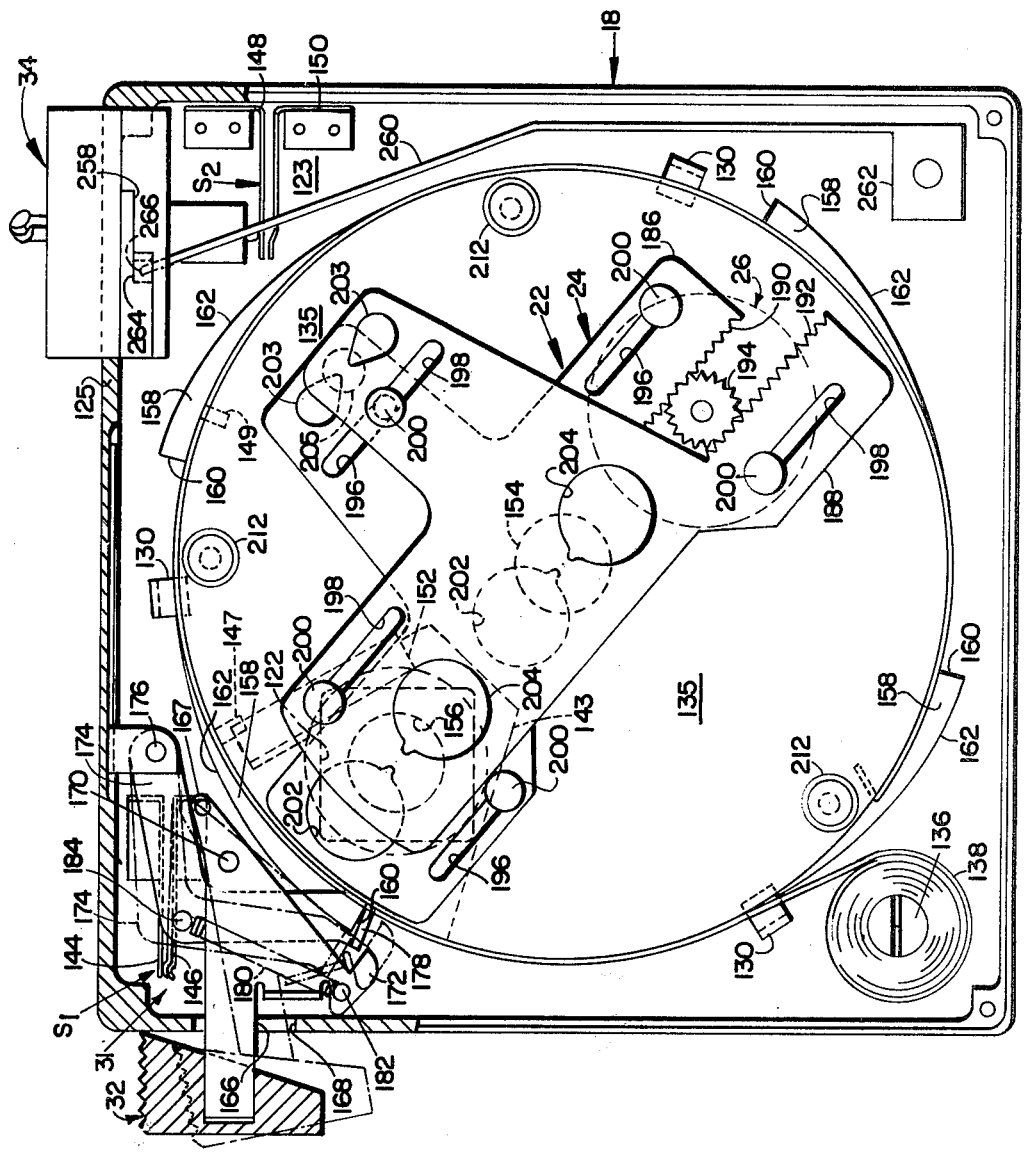
FIG. 4 is a section of a portion of the camera of FIG. 1 taken generally along lines 4—4 of FIG. 1.

As best shown in FIGS. 2, 3 and 4, the rectangular support member 18 comprises a rear wall section 123 having a forwardly depending flange 125 which surrounds the peripheral edges of the rear wall section 123.

The rear wall section 123 has four rectangularly shaped apertures 122 (FIG. 2) whose centers are automatically aligned with the centers of a corresponding one of each of the apertures, 92 through 98, of the frame members, 76 and 78, after the support member 18 has been attached to the forward wall 40 of the cone section 38. The purpose of the rectangular openings 122 is to permit light to enter the exposure chamber 48 to impinge on the individual fractional regions of the photosensitive area of the film unit after the cover members 102 have been actuated and the objective taking lens 16 has been aligned with the center of the apertures 122 in a manner which will be subsequently described.

Also located in the rear wall section 123 are four slotted openings 124, each of which is located adjacent a corresponding one of the apertures 122. The purpose of the slotted openings 124 is to permit corresponding ones of the cam sections 114 of the linkage mechanism for operating the covers 102 to extend through the slots 124 so that a force can be applied to them by a portion of the lens turret assembly 14 which will be described later.

Also located on the rear wall section 123 is a forwardly extending circular hub section 126 having an aperture 128 extending through the hub (FIGS. 2 and 3). The aperture 128 has its center aligned with the center of the exit opening 46 in the rear wall section 44 of the cone section 38. As will be subsequently explained, the optical axis of the objective taking lens 16 may be aligned with the aperture 128 of the rectangular support member 18 in order to produce a large format picture which covers the entire photosensitive area of the film unit.

The support member 18 also has mounted on it the escapement mechanism 31, the flashcube assembly 34, a pawl actuating lever 260, a slotted cylindrical spring post 136, a switch, S1, comprising an upper contact 144 and a lower contact 146, and a switch, S2, comprising an upper contact 148 and a lower contact 150 (see FIG. 3). The purpose of each one of these components, which are supported on the support member 18, will become apparent in the description that follows.

Lens Turret Assembly

The lens turret assembly 14, as best seen in FIG. 2, comprises a primary circular turret support member 132 having the shutter generally designated at 22 mounted thereon, an open ended cylindrical lens mount member 210 which is adapted to attach to the member 132, a capping plate 222 which is adapted to attach to the member 210, and the objective taking lens 16 which mounts on the lens mount member 210 via a slide 218 that is trapped in a complementary configured elongated groove 214, and then covered by the capping plate 222 in a manner to be described.

Figure 6:
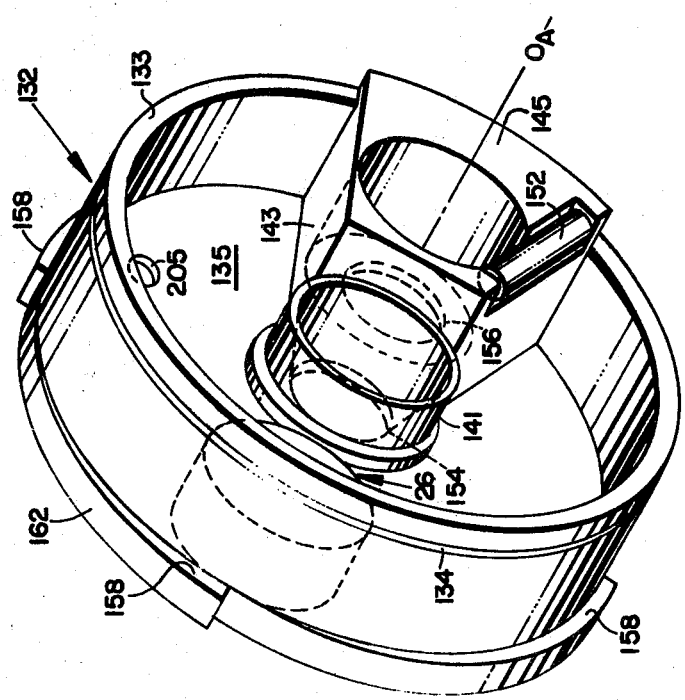
FIG. 6 is a perspective of a portion of the camera shown in FIG. 2.

Referring now to FIG. 6 there is shown a rear perspective view of the turret member 132 showing that the turret member 132 comprises a cylindrical barrel portion 133 which is capped at one end by a circular plate 135. The circular plate 135 has a central aperture 154 and an off axis aperture 156 which is radially spaced away from the central aperture 154 by a predetermined distance. When the turret member 132 is mounted on the rectangular support member 18, the axis of the central aperture 154 is coincident with the axis of the aperture 128 of the support member 18.

Located near the rear end of the cylindrical barrel section 133 is a groove 134 which extends around the circumference of the barrel section 133.

Surrounding the central aperture 154 and extending rearwardly therefrom is a cylindrical hub section 141 whose outside diameter is dimensioned to fit into the inside diameter of the aperture 128 located on the rectangular support member 18 (see FIG. 3).

The turret member 132 is mounted for rotation on the rectangular support member 18 by sliding the cylindrical hub section 141 into the complementary configured aperture 128 until the hub 141 seats onto the hub 126. There are also provided three brackets, 130, mounted on the rear wall section 123 of the rectangular support member 18 and which are angularly spaced apart by approximately 120°. These brackets 130 are adapted to fit into the circumferential slot 134 which is located on the cylindrical barrel portion 133 of the turret member 132 (see FIGS. 3 and 4). The function of the brackets 130 and the circumferential slot 134 is to retain the turret member 132 in its seated arrangement previously described. With this mounting arrangement for the turret 132 on the rectangular support member 18, it is possible, after the mounting has been completed, to rotate the turret member 132 so that the center of its off axis aperture 156 may be selectively aligned with the center of each one of the rectangular apertures, 122, located in the rear wall 123 of the rectangular support member 18. This mounting arrangement thus provides the camera with a lens turret feature which is mounted on the camera housing 12 for rotation about an axis which is perpendicular to and passes through the center of the film element's given photosensitive area.

A negator spring 138 is provided as a means for biasing the turret member 132 for rotation in a counterclockwise sense as shown in either FIGS. 2 or 4. The negator spring 138 has one end attached on the outside surface of the cylindrical barrel portion 133 of the turret member 132 and its other end attached to the slotted negator spring post 136 located on the lower left-hand corner of the rectangular support member 18. After the turret member 132 has been mounted to the rectangular support member 18, it may be rotated in a clockwise sense to tension the negator spring 138 and, if released, the turret member 132, under the influence of the negator spring 138, will rotate in a counterclockwise sense.

Referring now to FIG. 6 again, there is shown surrounding the off axis aperture 156 a cam actuating member 143 for engaging the cam sections 114 of the linkage mechanisms for the covers 102 to open or close the covers 102 as the turret member 132 rotates through 360°. The cam actuating member 143 has a surface 145 which extends beyond the rear edge of the cylindrical barrel section 133.

The cam actuating member 143 is also provided with a roller 152 whose surface is at the same level of the surface 145. The roller 152 serves as the first portion of the cam actuating member 143 which engages a cam section 114, and because it rotates thereby reduces friction.

Figure 9:
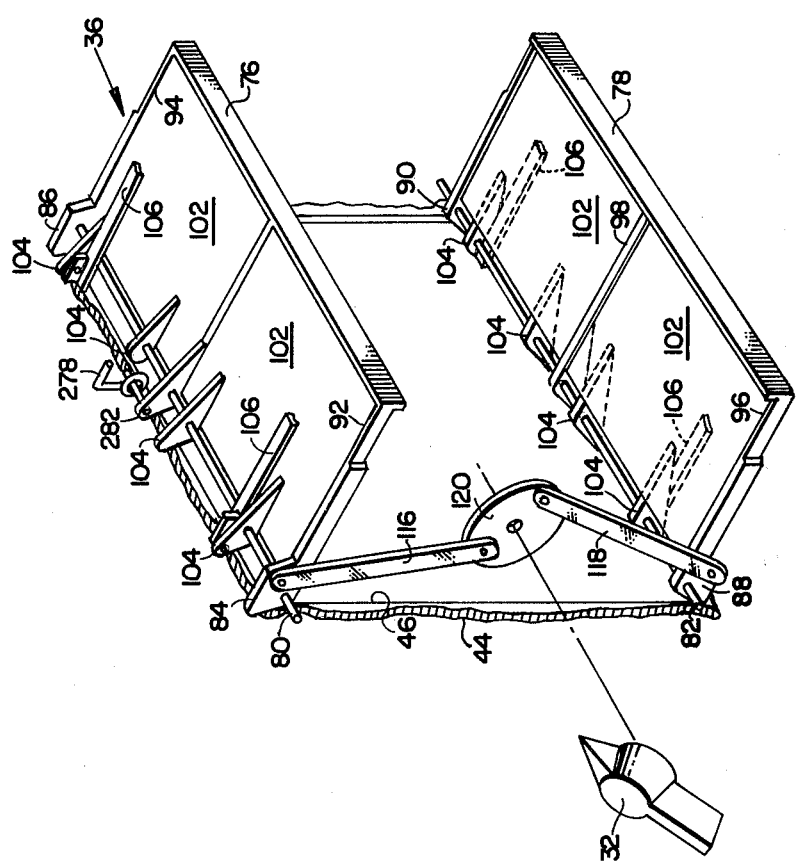
FIG. 9 is a fragmentary perspective of a portion of the camera of FIG. 2.

Once a cam section 114 has been engaged by the roller 152, it rides up onto the surface 145 thereby providing the force required to actuate a linkage mechanism to open a corresponding one of the cover members 102 in a manner previously described. A cam section 114 which has been engaged by the roller member 152 and lifted onto the surface 145 will stay engaged with the surface 145 until the turret member 132 is moved to a position where the cam section 114 falls off surface 145 thereby allowing the opened cover member 102 to automatically return to its closed position under the influence of a corresponding torsion spring 112. Therefore, whenever a cam section 114 is lifted onto the surface 145, a corresponding cover 102 will be opened, and whenever the cam section 114 falls off the surface 145, the corresponding cover member 102 will automatically close provided, of course, that the frame members 76 and 78, have been placed in their position as shown in FIGS. 2 and 4. However, if the frame members, 76 and 78, have been placed in their open positions (as shown in FIG. 9), the camming action of the cam actuating member 143 will be ineffectual to open or close the cover members 102 because all of the cam sections 114 will have been pulled out of the plane in which they might have been contacted by the surface 145 since the covers 102 move in conjunction with the frame members, 76 and 78, and drag the linkage mechanisms for the covers 102 along with them toward the rear of the camera 10.

Located on the cylindrical barrel section 133 toward its forward end are four inclined tooth segments 158 which are spaced 90° apart (FIGS. 4 and 6). Each inclined tooth 158 includes a forward edge 160 which extends radially outward from the turret member 132 and a gradually tapering cam surface 162 which terminates on the exterior surface of the cylindrical barrel section 133. The inclined teeth 158 cooperate with the escapement mechanism 31 to provide the camera with a means for selectively indexing the lens turret between a plurality of given angular locations, spaced 90° apart, within one revolution of the turret member 132 so that the optical axis of the objective taking lens 16 may be successively aligned with a corresponding one of the frame apertures, 92 through 98.

Referring now to FIG. 4, the escapement mechanism 31 is seen to comprise a pallet member 166 that is pivotally mounted about a pin 170. The pallet member 166 extends through the housing 18 through a slot 168 in the housing 18. Mounted on the portion of the member 166 extending to the exterior of the support member 18 is the camera actuator button 32. The pallet member 166 also includes a pallet section 172 that is adapted to engage the forward edges, 160, of each inclined tooth 158. Also included in the escapement mechanism 31 is a pallet member 174 that is pivotally mounted about a pin 176. The pallet member 174 also includes a pallet section 178 whose purpose is similar to that of the pallet section 172 of the pallet member 166. The pallet member 166 and the pallet member 172 are biased towards one another by a coil spring 180 which attaches to the pallet member 166 at a pin 182 and to the pallet member 174 at a pin 184. As illustrated in FIG. 4 this biasing arrangement, functions to urge the pallet section 178 downwardly against the exterior surface of the cylindrical barrel section 133 of the turret member 132 where it engages the forward edge 160 of an inclined tooth 158. This biasing arrangement also normally urges the pallet member 166 in an upward position as illustrated in FIG. 4 in which its pallet section 172 is out of the path of travel of the inclined teeth 158, i.e., it is above the highest point on the cam surface 162. When a camera user depresses the actuator button 32, he pivots the pallet member 166 about pivot point 170 and urges the pallet member 166 towards a second position (shown in phantom in FIG. 4) in which the pallet section 172 of the pallet member 166 is placed in the path of travel of the inclined teeth 158. As the pallet member 166 rotates about the pivot 170, a rear section 167 of the pallet member 166 applies a force against the pallet member 174 causing the pallet member 174 to rotate about its pivot point 176 to assume a second position, also illustrated in phantom in FIG. 4, in which its pallet section 178 is disengaged from the forward edge 160 of an inclined tooth 158. This latter arrangement of the escapement mechanism permits the turret member 132 to index through a small angular rotation corresponding to the separation between the engaging surfaces of the pallet sections 172 and 178. Also after the pallet member assumes its second position, the pin 184 on the second member 174 closes the switch contacts 146 and 144 of the switch, S1. With this arrangement, the turret member 132 is temporarily released to travel through a small angle and is thereafter immediately stopped from rotating because the pallet section 172 of the pallet member 166 is placed in the path of travel of the forward edge 160 prior to the pallet section 178 being moved out of its position of engagement.

When a camera user then releases the force he has applied to the escapement mechanism 31 via the actuating button 32, the biasing arrangement previously described automatically causes the escapement mechanism 31 to return to its first arrangement thereby releasing the turret member 132 because the pallet section 172 of the member 166 disengages from an inclined tooth 158 and the pallet section 178 of the pallet member 174 is again urged toward the exterior surface of the cylindrical barrel section 133. It should be noted that as a result of the separation between the pallet sections 172 and 178, the pallet section 178 when allowed to return to its first position after the escapement mechanism 31 has been released, will strike the declining cam surface 162 of one of the inclined teeth 158 and gradually ride down the cam surface 162 as the turret member 132 rotates in a counterclockwise direction until the pallet section 178 drops off the inclined cam surface 162 and rides directly on the surface 133 where it is then in a position to engage the next succeeding inclined tooth 158. Also the switch, S1, is again placed in its normally open position.

The shutter 22 which comprises the blade mechanism 24 and the stepper motor 26 is best illustrated with reference to FIGS. 2 and 4. The blade mechanism 24 comprises an opaque blade element 186 having a rack segment 190 and an opaque blade element 188 having a rack segment 192. The rack segments, 190 and 192, are engaged with a pinion gear 194 of the stepper motor 26.

The blade elements, 186 and 188, are mounted for counter-reciprocating motion on the front surface of the capping plate 135 of the turret member 132. In the arrangement illustrated, the blade element 186 is provided with three elongated slots 196, and the blade element 188 is also provided with three elongated slots 198. The blade elements, 186 and 188, are pinned to the circular blade 135 through the use of pins 200 which extend through their corresponding slots, 196 and 198, respectively.

Located in the blade element 186 are a pair of apertures 202 which are spaced apart from one another by a predetermined distance equal to the distance separating the centers of the apertures 154 and 156. In a similar manner, the blade element 188 is also provided with a pair of spaced apart apertures 204. As shown in FIG. 4, the blade element 186 is first placed on the circular plate 135, and then, the blade element 188 is placed on top of the blade element 186 in such a way that the blade element's apertures, 202 and 204, do not overlap each other. This arrangement precludes light from passing through either of the apertures, 154 or 156, when the blade elements are in their staggered arrangement as shown in FIG. 4. However, when the pinion 194 is caused to rotate in a clockwise sense, as illustrated in FIG. 4, it is clear that the blade elements, 186 and 188, will be removed in opposed directions so that their respective apertures, 202 and 204, will overlap each other to provide an aperture value which will permit light to simultaneously pass through each of the apertures, 154 and 156, located in the circular mounting plate 135.

Also located in each of the blade elements, 186 and 188, is an aperture 203 which operates in a fashion similar to that of the other apertures of the blade elements 186 and 188. The purpose of the apertures 203 is to provide a means for regulating the amount of light which may reach a photocell (not shown) which would be located behind an aperture 205 in the circular plate 135 (see FIGS. 4 and 6).

The stepper motor 26 may be selectively actuated by well-known electronic control means to provide a predetermined exposure interval. Examples of such control means are described in detail in U.S. Pat. No. 3,900,855 issued to John W. Stempeck on Aug. 19, 1975 and entitled "Exposure Control System and Method", U.S. Pat. No. 3,903,528 issued to Richard C. Kee on Sept. 2, 1975 and entitled "Exposure Control System for Photographic Apparatus", U.S. Pat. No. 3,945,025 issued to John W. Stempeck on Mar. 16, 1976 and entitled "Exposure Control System", and U.S. Pat. No. 3,882,522 issued to Irving Erlichman on May 6, 1975 and entitled "Non-Cocking Springless Shutter Developing Two Parameter Exposure Regulation".

In the foregoing manner, the camera 10 has been provided with a selectively actuable shutter 22 which includes an elongated blade mechanism 24 for selectively allowing scene light which emerges from the objective taking lens 16 to impinge upon the photosensitive area of the film unit to define a photographic exposure cycle, during which cycle an exposure of predetermined value is delivered to the film unit. The blade mechanism 24, thus arranged rotates in conjunction with the rotation of the lens turret assembly 14 and is mounted for movement transverse to the axis of rotation of the lens turret assembly 14 between a first blocking position which precludes scene light from impinging on the film unit 72 and a second unblocking position wherein at least one aperture value, structured for transmission of scene light to the film unit, is simultaneously defined at each of the apertures, 154 and 156, of the turret member 132.

Those skilled in the art will recognize how to provide an electrically conductive path between the switch, S1, which is provided for selectivity coupling a power source in the form of a storage battery (not shown) to an electronic control circuit, such as those previously referenced, which selectively drive the stepper motor 26.

The objective taking lens 16 is provided in the camera 10 for the purpose of forming a real image of a photographic scene in the focal plane of the camera 10. The objective taking lens 16 is preferably a front element focusing type, such as a Cooke Triplett, and includes an optical axis, OA, and a rear circular mount section 226 (see FIG. 2). The field coverage of the objective taking lens 16 should be chosen so that it is at least as large as the given photosensitive area of the film unit when the optical axis, OA, has been placed so that it is coincident with the axis of rotation of the turret member 132. When the optical axis, OA, of the objective taking lens 16 is coincident with the axis of rotation of the turret member 132, the optical axis, OA, will then intersect the center of the given photosensitive area of the film element.

Figure 5:
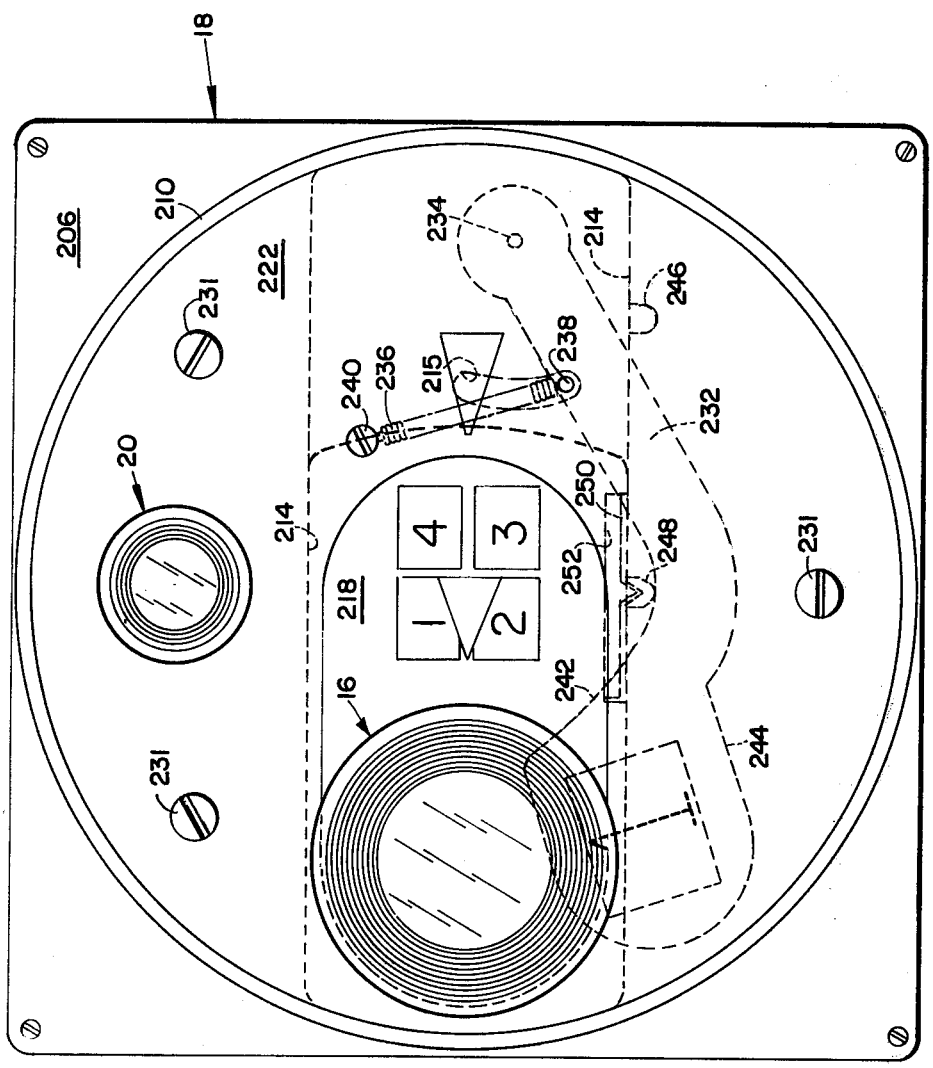
FIG. 5 is a front elevation of a portion of the camera of FIG. 1.

Referring now to FIGS. 2 and 5, there are shown means for mounting the objective taking lens 16 for slidable movement on the lens turret assembly 14 between an on-axis position wherein the optical axis, OA, of the objective taking lens 16 is aligned with the center of given photosensitive area of the film unit and a second position in which the optical axis, OA, of the objective taking lens 16 may be successively aligned with the centers of each of the fractional part regions of the given photosensitive area of the film unit. These means comprise the elongated groove 214 which is located in the base plate 217 of the lens mount 210. The lens mount slide 218 is provided for slidable movement within the elongated groove 214. The lens mount slide 218 includes an aperture 220 into which the lens mount section 226 inserts. The objective lens 16 may be rigidly attached to the lens mount slide 218 in any conventional manner such as with adhesives or screw thread arrangements.

Located in the elongated groove 214 is an elongated slot 216. The purpose of the slot 216 is to provide an unobstructed path for scene light from the objective taking lens 16 to proceed toward either of the apertures, 154 or 156, when the objective taking lens 16 is in either of its positions of alignment on the lens mount 210.

The capping plate 222 is attached to the base plate 217 to retain the lens mount slide 218 in the elongated groove 214. Located in the capping plate 222 is an elongated slot 224 which permits the lens 16 to be slid between its on-axis position and its radially spaced away off-axis position.

Assembly of the lens mount 210 onto the turret member 132 is accomplished in the following manner. Assuming that the turret member 132 has been attached to the rectangular housing member 18 in the manner previously described, a cover plate 206 is then attached to the rectangular housing member 18 such that an aperture 208 in the cover plate 206 provides access to the front surface of the circular capping plate 135 of the turret member 132. Provided on the front capping plate 135 are three bosses 212 having threaded screw holes. The bosses, 212, are spaced apart by approximately 120° (see FIG. 4). Located in the base plate 217 of the lens mount 210 are three holes, 219, which are positioned to receive the three mounting bosses 212 located on the circular capping plate 135. The lens mount 210, with this arrangement, may be accurately located on the turret member 132. After this has been done the lens mount slide 218 is then placed into its complementary configured slot 214.

Provided in the capping plate 222 are three additional holes 230 which are aligned with the holes 219. The capping plate 222 is then mounted to the lens mount 210 with the holes 230 in alignment with the holes 219. The objective taking lens 16 may then be inserted into its correspondingly configured hole 220 in the lens mount slide 218. The lens mount assembly, thus defined, may then be screwed to the turret member 132 with the use of conventional screw fasteners, 231 (see FIG. 5).

This mounting arrangement permits the objective taking lens 16 to be mounted for slidable movement such that its optical axis, OA, when moved into either its on-axis position or its off-axis position will be accurately aligned with a corresponding optical path which permits light to impinge on the film unit.

Means are provided which are responsive to the position of the objective taking lens 16 on the turret member 132 for preventing ambient light from entering the exposure chamber 48 from one of the positions of the objective taking lens 16 on the turret member 132 when the objective taking lens 16 has been moved into its other position so that only scene light emerging from the objective taking lens 16 from its position of alignment on the turret member 132 will impinge on the focal plane of the camera 10 during the exposure cycle. Part of the ambient light prevention means is provided by a section of the lens mount slide 218 which provides a cap that covers the central optical path of the camera 10 when the objective taking lens 16 has been slid into its radial off-axis position as shown in FIG. 5. The capping portion of the lens mount slide 218, as best shown in FIG. 5, is substantially identical with the area where the numerals 1, 2, 3, 4 appear.

In addition, a movable baffle 232 is provided to prevent ambient light from entering the camera during the exposure cycle while the objective taking lens 16 is in its on-axis position as shown in FIG. 1. The movable capping baffle 232 is pivotally mounted at a pin 234 which extends rearwardly from the base plate 271 of the lens mount 210. As best shown in FIGS. 2 and 5, the movable capping plate 232 is spring biased by a coil spring 236 which has one end pinned to the movable light baffle 232 at a pin 238 and the other end attached to the base plate 217 at a screw pin 240. A cam section 242 is included in the movable light baffle 232 and is adapted to be engaged by an extension of a lens mount section 226 which extends beyond the rear surface of the base plate 217 so that, as the objective taking lens 16 is moved from its on-axis position to its off-axis position, the lens mount section 226 engages the cam surface 242 and pivots the capping blade 232 out of the way such that an off-axis light blocking portion 244 is moved out of the off-axis optical path of the camera 10. When the lens is repositioned from its off-axis location to the on-axis location, the pivoting baffle 232, with this arrangement, automatically returns to a position wherein the light blocking section 244 is positioned under the influence of the biasing spring 236 over the off-axis aperture 156 located in the turret mount 132.

As a means for maintaining the position of the lens 16 in either its on-axis or off-axis positions, a detent arrangement is provided in the form of two spaced apart notches 246 and 248 which are located in a side edge of the elongated groove 214. Provided on the lens slide 218 on a corresponding side is a detent spring 250 which is mounted in a spring cut out section 252 (see FIG. 5). The detent spring 250 enters one of the detent notches, 246 or 248, when the objective taking lens 16 is in either its on-axis or off-axis position, respectively.

The photometer optical system 20 is mounted in an aperture 228 located on the capping plate 222 so that the optical system 20 is aligned with the photometer aperture 205 located in the circular capping plate 135.

Flashcube Assembly

Means are provided in the camera 10 for mounting a well known flashcube having four flashlamps for purposes of providing the camera 10 with the capability of taking pictures when the ambient light level is below some threshhold value. Referring now to FIGS. 2 and 4, the flashcube assembly 34 is seen to comprise a rotating socket 254 into which a flashcube may be placed, a pair of flash contacts 256 for providing electrical power to ignite a flashbulb, and a pawl member 258. The flashcube assembly 34 is of a well known type and may be either the design described in considerable detail in, for example, U.S. Pat. No. 3,545,354 issued to William J. McCune, Jr. on Dec. 8, 1970 and entitled "Photographic Exposure Control Apparatus" or that described in U.S. Pat. No. 3,589,254 issued to Bruce K. Johnson on June 29, 1971 and entitled "Exposure Control Mechanism for a Photographic Camera". Both of these patents are specifically incorporated by reference in this specification as representative of the structure of the flashcube assembly 34.

The flash socket 254 receives the flashcube containing a plurality of flashlamps and retains it within the flashcube assembly 34. The flashcube is then rotated in a clockwise sense to spring bias the socket 254 for rotation in a counterclockwise sense. A ratchet is provided on the socket having a plurality of teeth (not shown) which are engaged by the pawl member 258 in a manner described in the previously referenced patents. Referring to FIG. 4, when the pawl member 258 is moved to the right it disengages from the ratchet portion of the socket 254 permitting the flashcube to rotate from a predetermined operative position in which one of its flashlamps is pointing towards the photographic scene to another position following its ignition. The ratchet and pawl type mechanism described in the previously referenced patents comprise an actuable escapement means for selectively releasing the socket 254 to move a mounted flashcube assembly 34 and sequentially advance its individual flashlamps from a predetermined operative position to another position.

The pawl actuating lever 260 includes a lower end 262 which is rigidly attached to the rear wall section 123 of the rectangular support member 18. An end portion 266 of the pawl actuating lever 260 enters a slot 264 in the pawl member 258. As the turret member 132 rotates in a counterclockwise sense as shown in FIG. 4, an inclined tooth 158 will strike the pawl actuating lever 260 which, in turn, moves the pawl 258 to the right thereby permitting the escapement feature of the flashcube assembly 34 to be operated in a successive fashion. With this arrangement the pawl 258, which comprises part of the escapement mechanism of the flashcube assembly 34, is operated in synchronization with the movement of the turret member 132 from one of its angular positions to a successive one of its angular positions so that a flashlamp is in its predetermined operative position whenever a flash picture is to be taken.

Viewfinder Assembly

Referring now to FIGS. 2 and 3, it can be seen that the viewfinder assembly 28 is mounted on the camera housing 12 and comprises a negative lens 268 which is spaced forwardly of a positive eye lens 270. Located between the negative lens 268 and the positive eye lens 270 is a mask 272 having an aperture 274 therein. The mask 272 is pivotally mounted about a pin 276. A torsion spring 277 is provided for biasing the mask 272 in a counterclockwise direction as shown in FIG. 3. A connecting rod 278 is provided and is pivotally mounted at one end to the mask 272 and at its other end to a bell crank 282 which is positioned on the upper frame member 84 (see FIG. 2). A slot 280 is provided in the cone section 38 for the connecting rod 278. The function of the aperture 274 in the mask 272 is to provide the viewfinder assembly 28 with a field of view, when in the position as illustrated in FIG. 3, which is generally coextensive with the field of view defined by the objective taking lens 16 in combination with a fractional region of the photosensitive area of a film unit.

When the frame members, 76 and 78, are moved into their full open position, the mask 272 is pivoted about its pivot point 276 via the connecting rod 278 which is connected to the bell crank 282 located on the upper frame member 76 to a position in which the mask 272 no longer restricts the field of view of the viewfinder assembly 28. When the viewfinder assembly 28 is into this second arrangement (not shown), its field of view is generally coextensive with the camera's field of view when the objective taking lens 16 is placed on-axis. The field of view of the camera 10, when the objective taking lens 16 is positioned on-axis, is related to the focal length of the objective taking lens 16 in combination with the dimensions of the full photosensitive area of the film unit that is available for exposure since the frame members, 76 and 78, and the cover members 102, will have been moved into their first arrangement as previously discussed.

Thus, actuable viewfinder means have been provided which are structured for movement between a first arrangement for viewing a field of view generally coextensive with the camera's field of view for taking a plurality of smaller format pictures and a second arrangement in which the field of view of the viewfinder assembly 28 is generally coextensive with the camera's field of view for taking a larger format picture.

MANNER OF OPERATION

Having described the structural details and functions of the consistuent parts of the major components, the manner of operation of the camera 10 will now be described along with the operating relationships of the various constituent parts of the major components.

A. Ambient Operation

It will first be assumed that the user of the camera 10 wishes to make four small format photographs. In order to do this, the user will first position the objective taking lens 16 in its off-axis location as illustrated in FIG. 5. The user will then move the format selector switch 30 into its position shown in FIG. 1. It will be recalled that when the format selection switch 30 has been positioned so that it points to the numeral 4 as illustrated in FIG. 1, the frame members, 76 and 78, will be in a position as illustrated in FIG. 2 and FIG. 3 covering the exit aperture 46 located in the rear wall 44 of the cone section 38. Also the frame member covers 102, since they are spring biased by the torsion springs 112, will automatically assume their position covering each of the frame member apertures, 92-98. When the aperture covers 102 are in their closed position, it will be recalled that the cam sections 114 of the input pivot levers 108 extend through their corresponding slots 124 in the rectangular structural member 18.

The user then rotates the lens turret assembly 14 in a clockwise direction against the force of the negator spring 138 as illustrated in FIG. 1. The lens turret assembly 14 will rotate to an extreme position as shown in FIG. 4 wherein the cam actuating member 143 is brought into contact with a stop 147 which prevents the turret member 132 from being further rotating in a clockwise direction. When brought into this stop position, the pallet section 178 of the pallet member 174 of the escapement mechanism 31 captures a leading edge 160 of one of the inclined teeth 158. It will be noted that the angular spacing between the stop 147 and the engaging surface of the pallet section 178 are angularly displaced with respect to one another so that the optical axis, OA, of the objective taking lens 16, when in this position, will be slightly out of alignment with the center of the aperture 92 of the upper frame member 76. Also note, with reference to FIG. 4, that when the turret member 132 is in the position illustrated, the blade mechanism is positioned in its first arrangement wherein all of its apertures, 202 and 204, are misaligned with respect to one another so that the blade mechanism 24, while in this position, precludes light from the objective taking lens 16 from impinging upon the film unit 72.

As a result of the turret member 132 having been placed in the position illustrated in FIG. 4, the surface 145 of the cam actuating member engages a cam section 114 of a corresponding pivot input link 108 to automatically open the cover 102 associated with the frame aperture 92 to move it from its position illustrated in FIG. 1 to its position as illustrated in FIG. 3. With the camera 10 in this state, it is now in readiness to expose the upper left quadrant of the photosensitive area of the film unit.

To make the exposure, the user depresses the camera actuating button 32 to move the escapement mechanism 31 from its first position as illustrated in FIG. 4 to its second position as illustrated in phantom in FIG. 4. As a result of having moved the escapement mechanism 31 from its first arrangement to its second arrangement, the pallet section 178 of the pallet member 174 disengages from the forward edge 160 of the inclined tooth 158 with which it is in contact. Just prior to the pallet member 174 disengaging from the engaged inclined tooth, 158, however, the pallet member 166 is moved into the path of travel of the leading edge 160 of the inclined tooth 158 so that its pallet section 172 is in a position to immediately capture the turret member 132 and prevent it from further rotating under the influence of the tension created by the negator spring 138.

It will be recalled that there is a slight angular separation between the pallet sections, 172 and 178, which permits the turret member 132 to rotate through a small angle which is related to the angular separation between the pallet sections 172 and 178. After the turret member 132 rotates through this small angle, the optical axis, OA, of the objective taking lens 16 is now perfectly aligned with the center of the aperture 92 of the upper frame member 76. When the first member 166 of the escapement mechanism 31 reaches its extreme downward position, it will be recalled that the pallet member 174 has closed the switch contacts 144 and 146 of the switch, S1. When the switch, S1, is closed, power is supplied to the electronic control circuit which, in turn, activates the stepper motor 26 to move the blade mechanism from its arrangement illustrated in FIG. 4 to a second arrangement in which the apertures, 202 and 204, at the off-axis position overlap each other to define the exposure cycle. During the exposure cycle, the apertures, 202 and 204, remain overlapped for some predetermined time interval at the termination of which, the stepper motor 26 is caused to reverse its direction of rotation and again misalign the apertures 202 and 204. During the time in which the apertures 202 and 204 overlap each other, scene light from the objective taking lens 16 is allowed to impinge upon the photosensitive surface of the film unit which has been uncovered as a result of the cover 102 having been moved to its position shown in FIG. 3.

The escapement mechanism 31 is then released by the user taking his finger off the camera actuating button 32. When this happens, the escapement mechanism 31 is permitted to return to its first arrangement under the influence of the coil spring 180, and the lens turret assembly is permitted to automatically index through 90° after which the escapement mechanism 31 recaptures and arrests the motion of the turret member 132 by engaging a next succeeding tooth 158.

No ambient light is permitted to enter the exposure chamber 48 through the aperture 154 during the exposure cycle because the aperture 154, which is also uncovered by its corresponding pair of apertures, 202 and 204, is precluded from transmitting light into the exposure chamber 48 as a result of the ambient capping arrangement previously described.

When the lens turret member 132 member rotates to its second position, the aperture 96 of the lower frame member 78 has its cover 102 moved to the position illustrated in FIG. 2. This occurs because the cam section 114 which has in engagement with the surface 145 of the cam actuating member 143 is moved out of engagement with the linkage mechanism associated with the first quadrant and is brought into engagement with the cam section 114 associated with the second quadrant.

In this manner the lens turret member 132 is sequentially indexed through each quadrant until the cam actuating member 143 of the turret member 132 is rotated into a second extreme stop position wherein the cam actuating member 143 is brought into engagement with a second stop 149 which prevents it from further rotating in a counterclockwise sense when viewed in FIG. 4.

The user then removes the exposed film unit 172 via the processing rollers 64 and 66 in a well-known manner.

The four small format pictures that result from this mode of operation are illustrated in FIG. 8. It can be seen with reference to the stick figures in FIG. 8 that the four small format pictures represent four individual exposures which are distinctly different from one another. Moreover, these four small format pictures may be taken in fairly rapid succession because the lens turret assembly 14 is automatically rotated, via its indexing means, between the four different positions in which the optical axis, OA, of the objective taking lens 16 is aligned with a corresponding small format region of the photosensitve area of the film unit.

It will also be recalled that, when the frame members, 76 and 78, have been placed into their first arrangement, the viewfinder assembly 28 has been placed into into an arrangement wherein its field of view is generally coextensive with the scene that will be captured in each of the four small format pictures.

If it is decided by the user that he wishes to make one large format picture instead of the four small format pictures, he simply moves the objective taking lens 16 into its on axis position as illustrated in FIG. 1 and then moves the format selector switch 30 so that it is aligned with the numeral 1 located on the sidewall section 39 of the housing 12 of the camera 10 (see FIG. 1).

To make one large format picture, it is immaterial whether or not the lens turret assembly 14 is rotated into its extreme clockwise stop position or is left in its extreme counterclockwise stop position (not illustrated). In either event, the user proceeds as before and simply depresses the camera actuating button 32 to move the escapement mechanism 31 between its first and second arrangements. As is obvious, actuation of the escapement mechanism 31 causes the switch, S1, to close actuating the shutter 22 as previously described, whether or not the lens turret assembly 14 has been wound up in a clockwise direction or is in its extreme counterclockwise stop position. It will be recalled that the closure of switch, S1, causes the blade mechanism 24 to be displaced between its first and second arrangements to define the exposure cycle. Thus, the blade mechanism 22 will be displaced between its first and second arrangements uncovering both of the apertures, 154 and 156, in the turret member 132 thereby permitting light from the objective taking lens 16 to pass through the aperture 154 during the exposure cycle and impinge upon the full photosensitive surface area of the film element. This is possible, it will be recalled, because movement of the format selector switch 30 into the position required automatically moves the frame members, 76 and 78, into their full open position (FIG. 9). When the frame members, 76 and 78, are in their full open position, it will be recalled that the covers 102 automatically move in conjunction with the movement of the frame members, 76 and 78, thereby permitting the full photosensitive area of the film unit to be exposed.

Movement of the frame members, 76 and 78, into their full open position causes the viewfinder assembly 28 to have its field of view changed to be generally coextensive with the field of view of the camera 10 when the objective taking lens 16 has been placed on-axis.

During the large format mode of operation, no light will be permitted to enter the exposure chamber 48 through the off-axis aperture 156 of the turret member 132 because the blocking section 244 of the movable baffle 232 will have been moved into place covering the aperture 156 thereby precluding light from entering the exposure chamber 48 during the exposure cycle.

B. Flash Operation

The camera 10 may be used to make either one large format picture or four small format pictures when the ambient light level is below some threshold value which requires the use of artificial illumination for proper exposure. When taking either a large format picture or four smaller format pictures, the flash operation is the same.

To take flash pictures, the user inserts a flashcube into the flashcube assembly 34 where it is retained by the socket 258. Upon insertion of a flashcube into the socket 254, the contacts 148 and 150 of the switch, S2, are closed. Those skilled in the art will recognize how to provide means in combination with the switch, S2, to place the flashcube into electrical contact with the electronic control circuit previously referenced and also provide power to ignite the flashcube.

The lens turret assembly 14 is then wound up. After insertion of the flashcube into the flashcube assembly 34, the flashcube is then rotated in a clockwise direction until it reaches an extreme stop position in which one of its flashlamps is positioned facing a photographic scene.

When this has been done the turret member 132 will be in its position as shown in FIG. 4 and the switch, S2, will have been closed. The camera user, after having selected his format by actuating the format selection lever 30, then depresses the camera actuating button 32 as before. Since the flashcube via the closure of switch, S2, will now have been coupled into the electronic control circuit, it will be automatically fired in synchronization with the displacement of the blade assembly 24 into its second unblocking arrangement in a well known manner. After the picture has been taken, the lens turret assembly 14 indexes to its next succeeding position in a manner previously described. While the lens turret assembly 14 moves into its next succeeding position, an inclined tooth 158 will strike the pawl actuating lever 260 (refer to FIG. 4) to index a next succeeding flashlamp in the flashcube assembly into a position wherein it will be facing the photographic scene and the expended flashcube, which was previously in its place, will now be moved into an inoperative location. This process continues until all four flashcubes have been expended.

Certain changes may be made in the above described embodiment without departing from the scope of the invention, and those skilled in the art may make such changes according to the teachings of the disclosure. Therefore, it is intended that all matter contained in the above description or shown in the accompanying drawings shall be interpreted as illustrative and not in a limiting sense.

What is claimed is:

1. A multiple format photographic camera comprising:

a housing including means for accommodating the positioning of at least one film element having a given photosensitive area in a focal plane to facilitate exposure of the film element;

actuable light blocking means for selectively controlling the size of the film element's given photosensitive area that may be exposed to light, said light blocking means having a plurality of apertures each having an area corresponding to a predetermined fractional part of the film element's given photosensitive area and in combination corresponding to the film element's given photosensitive area and including a movable cover normally biased to close each of said apertures, said blocking means being structured for movement into a first arrangement wherein the film element's full photosensitive area may be exposed to light to produce one large picture and a second arrangement wherein each of said covers is adapted to be independently actuated to open or close said apertures so that individual regions of the film element's given photosensitive area may be sequentially exposed to light to make a plurality of smaller pictures which cover substantially the same area of the film element that would otherwise be occupied by the large picture;

manually operable means for effecting the movement of said light blocking means into either its said first or said second arrangement thereby providing the user of said camera with the option of placing said camera in readiness for making either one large picture or a plurality of smaller pictures;

a lens turret mounted on said housing for rotation about an axis passing substantially centrally therethrough;

an objective taking lens, having an optical axis, for forming in said focal plane a real image of a scene to be photographed, said objective taking lens being slidably mounted on said lens turret for movement between a first position in which its said optical axis is coincident with said lens turret's axis of rotation and optically aligned with the center of the film element's given photosensitive area thereby permitting the formation of said real image to make one large picture when said blocking means is in its said first arrangement, and a second position wherein its said optical axis is radially spaced away from said lens turret's axis of rotation by a predetermined distance;

means for selectively indexing said lens turret between a plurality of given angular locations within one revolution of said lens turret so that said optical axis of said objective taking lens may be sequentially aligned with a corresponding one of said apertures of said blocking means when said objective taking lens has been moved into its said second position and said light blocking means has been moved into its said second arrangement;

actuator means coupled with said covers of said light blocking means for independently opening or closing said apertures of said light blocking means in response to the angular position of said lens turret, said lens turret and said actuator means each having complementary configured portions for automatically effecting the actuation of said covers in synchronization with the placement of said lens turret into each of its said given angular locations when said light blocking means has been placed into its said second arrangement, said actuator means being ineffectual when said light blocking means has been placed in its said first arangement;

means for selectively allowing scene light emerging from said objective taking lens to impinge upon said focal plane to define a photographic exposure cycle during which cycle, an exposure of predetermined value is delivered to that photosensitive area of the film element with which said objective taking lens has been aligned and which is not restricted from receiving light by said light blocking means; and means responsive to the position of said objective taking lens on said lens turret for preventing ambient light from entering said housing from one of said positions of said objective taking lens on said lens turret while said objective taking lens is in the other of its said positions on said lens turret so that only scene light emerging from said objective taking lens from its position of alignment on said lens turret will impinge on said focal plane during said exposure cycle.

2. The camera of claim 1 wherein said actuable light blocking means comprise a pair of frame members each pivotally mounted adjacent respective opposite sides of said focal plane for pivotal movement with respect to said housing between a first position in which said frame members overlie at least part of the film element's photosensitive area and a second position in which said frame members are spaced away from their said first position such that no portion of said frame members overlie any part of the film element's entire photosensitive area, each of said frame members having a pair of said apertures positioned adjacent one another defining said fractional parts of the film element's given photosensitive area when said frame members have been moved into their said first position overlying the film element's entire photosensitive area, each of said aperture covers being pivotally mounted with respect to corresponding ones of said frame members for independent pivotal movement between a first position in which it covers its corresponding frame member aperture in overlying relationship and a second position in which it uncovers its corresponding frame member aperture thereby facilitating the independent opening or closing of said frame member apertures when said frame members have been moved into their said first position, said covers being independently spring biased to assume their said normal positions covering said frame member apertures so that when said frame members are moved into their said second position, said covers automatically move in conjunction with said frame members.

3. The camera of claim 2 wherein said actuator means comprise a plurality of independently actuable linkage mechanisms each having one end pivotally coupled with a respective one of said covers and another end pivotally coupled with said housing adjacent said lens turret, said complementary configured portions of said actuator means comprising cam portions on each of said linkage mechanisms said complementary configured portion of said lens turret comprising a cam actuating member, said cam portions adapted to be engaged by said cam actuating member of said lens turret, said cam actuating member striking one of said cam portions when said lens turret is indexed into one of its said given angular positions to open a corresponding one of said covers when said frame members have been placed in their said first position, one of said covers being opened when said lens turret moves into one of said given angular locations and automatically closed when said lens turret is indexed to a next succeeding one of said given angular locations.

4. The camera of claim 3 further including spring drive means for biasing said lens turret for rotation in a first direction, said spring drive means being tensioned by rotation of said lens turret in a direction opposite to said first direction and wherein said selective indexing means is configured to control rotation of said lens turret in said first direction when said spring drive means has been tensioned, said indexing means permitting incremental rotation of said lens turret in said first direction to sequentially advance said lens turret between said angular locations to facilitate the successive exposure of four smaller format pictures when said objective taking lens has been placed in its said second position and said frame members have been placed in their said first position.

5. The camera of claim 4 further including:
  (a) means for detachably mounting and retaining on said housing a flashlamp assembly having a plurality of flashlamps;
  (b) means for biasing said flashlamp mounting and retaining means for rotation in a first direction;
  (c) actuable escapement means for selectively releasing said flashlamp mounting and retaining means to move the mounted flashlamp assembly and sequentially advance the flashlamps from a predetermined operative position to another position; and
  (d) escapement operator means mounted on said housing and coupled with said actuable escapement means to actuate said escapement means, said escapement operator means and said lens turret having complementary configured portions arranged to effect the operation of said actuable escapement means in synchronization with the movement of said lens turret from one of its said angular positions to a successive one of its said angular positions so that a flashlamp is in its said predetermined operative position whenever a flash picture is ready to be taken.

6. A multiple format photographic camera comprising:
  a housing including means for accommodating the positioning of at least one film element having a given photosensitive area in a focal plane to facilitate exposure of the film element;
  actuable light blocking means for selectively controlling the size of the film element's given photosensitive area that may be exposed to light, said light blocking means being configured and arranged to permit light to expose the film element's entire photosensitive area to make one large picture or only a predetermined fractional part of the film element's given photosensitive area at a time so that individual regions of the film element's photosensitive area may be independently exposed to light in succession to make a plurality of smaller pictures which cover substantially the same area that would otherwise be occupied by the large picture;
  a lens turret mounted on said housing for rotation about an axis passing substantially centrally therethrough;
  an objective taking lens, having an optical axis, for forming in said focal plane a real image of a scene to be photographed, said objective taking lens being slidably mounted on said lens turret for movement between a first position in which its said optical axis is coincident with said lens turret's axis of rotation and optically aligned with the center of the film element's given photosensitive area thereby permitting the formation of said real image to make one large picture when said blocking means has been actuated to permit light to expose the film element's entire photosensitive area, and a second position wherein its said optical axis is radially spaced away from said lens turret's axis of rotation by a predetermined distance;
  means for selectively indexing said lens turret between a plurality of given angular locations within one revolution of said lens turret so that said optical axis of said objective taking lens may be sequentially aligned with the center of a corresponding one of said individual regions of the film element when said objective taking lens has been moved into its said second position and said light blocking means has been actuated to independently permit light to expose said individual regions of the film element;
  an elongated blade mechanism for selectively allowing scene light emerging from said objective taking lens to impinge upon said focal plane to define a photographic exposure cycle during which cycle, an exposure of predetermined value is delivered to that photosensitve area of the film element with which said objective taking lens has been aligned and which is not restricted from receiving light by said blocking means, said blade mechanism being arranged to rotate in conjunction with said lens turret and mounted for movement transverse to said lens turret's axis of rotation between a first blocking position precluding scene light from impinging on said focal plane and a second unblocking position wherein at least one aperture value structured for transmission of scene light to said focal plane is simultaneously defined at each of said objective taking lens' positions on said lens turret;
  selectively actuable drive means for moving said blade mechanism between its said first and said second positions; and
  means responsive to the position of said objective taking lens on said lens turret for preventing ambient light from entering said housing from one of said positions of said objective taking lens on said lens turret while said objective taking lens is in the other of its said positions on said lens turret so that only scene light emerging from said objective taking lens from its position of alignment on said lens turret can impinge on said focal plane during said exposure cycle.

7. The camera of claim 6 wherein said blade mechanism is mounted on said lens turret with its elongated dimension radially extending between said first and second positions of said objective taking lens on said lens turret so that said blade mechanism rotates as said lens turret rotates.

8. The camera of claim 7 wherein said blade mechanism comprises a pair of blade elements mounted for counter-reciprocating motion with respect to one another, each of said blade elements having a pair of spaced apart apertures of predetermined size and location, said apertures of one of said blade elements being misaligned with corresponding ones of said apertures on the other of said blade element when said blade mechanism is in its said first blocking position and at least partially overlapping each other when said blade mechanism is in its said second position to simultaneously define said at least one said aperture value.

9. The camera of claim 8 wherein said selectively actuable drive means is a stepper type, electrically powered motor fixedly mounted on said lens turret.

10. The camera of claim 6 wherein said selectively actuable drive means is a stepper type, electrically powered motor.

11. The camera of claim 6 further including:
(a) means for detachably mounting and retaining on said housing a flashlamp assembly having a plurality of flashlamps;
(b) means for biasing said flashlamp mounting and retaining means for rotation in a first direction;
(c) actuable escapement means for selectively releasing said flashlamp mounting and retaining means to move the mounted flashlamp assembly and sequentially advance the flashlamps from a predetermined operative position to another position; and
(d) escapement operator means mounted on said housing and coupled with said actuable escapement means to actuate said escapement means, said escapement operator means and said lens turret having complementary configured portions arranged to effect the operation of said actuable escapement means in synchronization with the movement of said lens turret from one of its said angular positions to a successive one of its said angular positions so that a flashlamp is in its said predetermined operative position whenever a flash picture is ready to be taken.

12. A photographic camera for successively exposing through a single lens a plurality of predetermined discrete regions of a given-sized film element, which plurality in combination comprise substantially the entire photosensitive area of the film element, said camera comprising:
a housing including means for accommodating the positioning of at least one film element having a given photosensitive area in a focal plane to facilitate exposure of the film element;
a lens turret mounted on said housing for rotation about an axis passing substantially centrally therethrough;
an objective taking lens, having an optical axis, mounted on said lens turret with its said optical axis radially spaced away from said lens turret's axis of rotation by a predetermined distance;
electrically powered shutter means for selectively allowing scene light emerging from said objective taking lens to impinge upon said focal plane;
a switch for electrically coupling said shutter means and a power source, said switch being normally open;
spring drive means for biasing said lens turret for rotation in a first direction, said spring drive means being tensioned by rotation of said lens turret in a direction opposite to said first direction;
an actuator;
means for biasing said actuator in a first direction;
means responsive to the manual displacement of said actuator from its initial position into a second position against the force exerted thereon by said biasing means and the subsequent return of said actuator to its said initial position under the influence of said biasing means for facilitating the indexing of said turret under the influence of said spring drive means from one position wherein the optical axis of said taking lens is aligned intermediate of the centers of a first and second adjacent region of the film element's given photosensitive area to a second position wherein the optical axis of said objective taking lens is aligned with the center of the second fractional region of the film element's given photosensitive area, for effecting the temporary closure of said switch subsequent to said turret's being disposed in its said second position, and then for indexing said lens turret under the influence of said spring drive means from its said second position into a third position wherein the optical axis of said taking lens is aligned intermediate the center of the second region of the film element's given photosensitive area and the center of the region of the film element's given photosensitive area which is disposed on the opposite side of its second region from its first region.

13. The camera of claim 12 wherein said last stated means comprises a plurality of teeth, corresponding to the number of fractional part areas of said film element's given photosensitive area, equally spaced circumferentially of the axis of said lens turret and mounted for rotation therewith, first and second pallet members pivotally mounted to said housing to alternately engage one of said teeth in response to said manual displacement of said actuator, said second pallet member being connected to said actuator, said first and second pallet members each having first positions, when said actuator is in its said initial position, in which said first pallet member is engaged with said one tooth to hold said lens turret in said first mentioned intermediate position and said second pallet member is out of the path of travel of said teeth, and second positions, when said actuator is in its said second position, in which said first pallet member is disengaged from said one tooth thereby releasing said turret to rotate under the influence of said spring biasing means toward said lens turret's second position and wherein said second pallet member is placed in the path of travel of said teeth to engage said one tooth to stop said turret in its said second position, said first and second pallet members being configured and arranged with respect to one another so that said first pallet member is moved into its said second position by said second pallet member.

14. The camera of claim 13 wherein said switch and said first pallet member are configured and arranged with respect to one another so that said switch is closed by said first pallet member when said actuator is in its said second position.

15. The camera of claim 12 wherein said actuator biasing means comprises a spring connecting said first and second pallet members such that said first pallet member is always urged toward its said first position and said second pallet member is always urged toward its said first position.

* * * * *